United States Patent [19]

Gurwicz

[11] 4,042,865
[45] Aug. 16, 1977

[54] SEPARATELY EXCITED D.C. MOTORS

[75] Inventor: David Gurwicz, Gateshead, England

[73] Assignee: Sevcon Limited, Gateshead, England

[21] Appl. No.: 488,255

[22] Filed: July 12, 1974

Related U.S. Application Data

[63] Continuation-in-part of Ser. No. 339,181, March 8, 1973, abandoned.

[30] Foreign Application Priority Data

June 21, 1974 United Kingdom ............... 27708/74

[51] Int. Cl.² ............................................. H02P 5/16
[52] U.S. Cl. .................... 318/338; 318/351; 318/331; 318/432; 318/269
[58] Field of Search ............... 318/308, 338, 351, 356, 318/532, 345 G, 345 H, 350, 521, 432, 434, 433, 331, 269

[56] References Cited

U.S. PATENT DOCUMENTS

| | | | |
|---|---|---|---|
| 2,832,026 | 4/1958 | McAdie | 318/357 |
| 2,876,408 | 3/1959 | Alexanderson | 318/357 |
| 2,964,691 | 12/1960 | Dinger | 318/338 |
| 3,302,089 | 1/1967 | Rosa | 318/356 |
| 3,388,306 | 6/1968 | Koppelmann | 318/338 |
| 3,466,522 | 9/1969 | Cushing | 318/338 |
| 3,593,086 | 7/1971 | Thombs | 318/356 |
| 3,599,064 | 8/1971 | Friedman | 318/338 |
| 3,675,105 | 7/1972 | Petrigalla | 318/356 |
| 3,764,822 | 10/1973 | Ebbinge et al. | 318/345 X |

Primary Examiner—B. Dobeck
Attorney, Agent, or Firm—Alfred H. Rosen; Frank A. Steinhilper

[57] ABSTRACT

A separately excited speed-controlled D.C. motor which has constant armature current and pulse-controlled field current has its armature connected by way of a bridge rectifier and an inductor to an A.C. source of substantially greater r.m.s. voltage than the rated supply voltage of the armature, the inductor serving to regulate the armature current. The field winding is connected to a field excitation supply and to a thyristor chopper and the mean current through the field winding controlled by the thyristor chopper thereby to control the armature torque and therefore the speed. The field winding may comprise two field coils arranged to produce opposing magnetic fields, the thyristor chopper serving to control the net magnitude and direction of the motor field. A thyristor chopper may be provided in the armature circuit to maintain a constant armature current during plugging of the motor.

20 Claims, 4 Drawing Figures

SEPARATELY EXCITED D.C. MOTORS

CROSS-REFERENCE TO RELATED APPLICATION

This application is a continuation-in-part application of copending application Ser. No. 339,181, filed Mar. 8, 1973, now abandoned.

BACKGROUND OF THE INVENTION

This invention relates to separately excited D.C. motors.

SUMMARY OF THE INVENTION

The present invention provides a speed-controlled D.C. motor in which the above problems are resolved.

The present invention consists in a separately excited D.C. motor having an armature, regulator means connected to the armature and adapted for connection to a supply voltage substantially greater in magnitude than the rated supply voltage of the armature, the regulator means serving to maintain the armature current at a substantially constant level during operation, a field winding, means for connecting the field winding to a separate source of excitation and controllable static swiching means for varying the current through the field winding thereby to control the armature speed in dependence substantially exclusively on the current in the field winding.

It will be appreciated that the constancy of the armature current arises by virtue of the supply voltage being substantially greater in magnitude than the reaction EMF of the armature. The armature current is given by the supply voltage minus the reaction EMF, divided by the armature impedance plus the regulator means impedance. The only variable is reaction EMF, which is proportional to armature speed, and since the supply voltage is substantially greater than the reaction EMF the effect of the reaction EMF on armature current is small and the armature current remains substantially constant over the full range of armature speed.

Preferably, the controllable static switching means are so connected in relation to the excitation source and the field winding as to maintain, during operation, current flow from the source at all times.

Preferably, the regulator means include impedance means and a full wave rectifier bridge having output terminals connected to the armature and input terminals connected to the impedance means.

In one form of the invention current limiting means are provided in the path between the field winding and its source of excitation, the controllable static switching means during conduction thereof being operable to divert current from the field winding.

In another form of the invention the field winding comprises first and second field coils arranged to produce opposing magnetic fields, the controllable static switching means serving to afford a variable mean current in each of the field windings.

Suitably, for use of the motor of the invention for plugging operation, i.e., reversing the armature or field connections to brake the motor, the regulator means are provided with further controllable static switching means in the series circuit including the armature and the rectifier bridge and control means for maintaining the further controllable static switching means in conduction during motoring operation and for effecting pulsed conduction of the further controllable static switching means during plugging, a resistor being introduced into the said series circuit during interpulse periods and the pulsed conduction being controlled by the control means to maintain during plugging a predetermined average armature current.

Advantageously, the resistor is connected in the series circuit including the armature and the rectifier bridge and is short-circuited by the further controllable static switching means during conduction thereof.

BRIEF DESCRIPTION OF THE DRAWINGS

Throughout the drawings, like parts are indicated by the same reference numerals.

DESCRIPTION OF THE PREFERRED EMBODIMENTS

Figure 1:
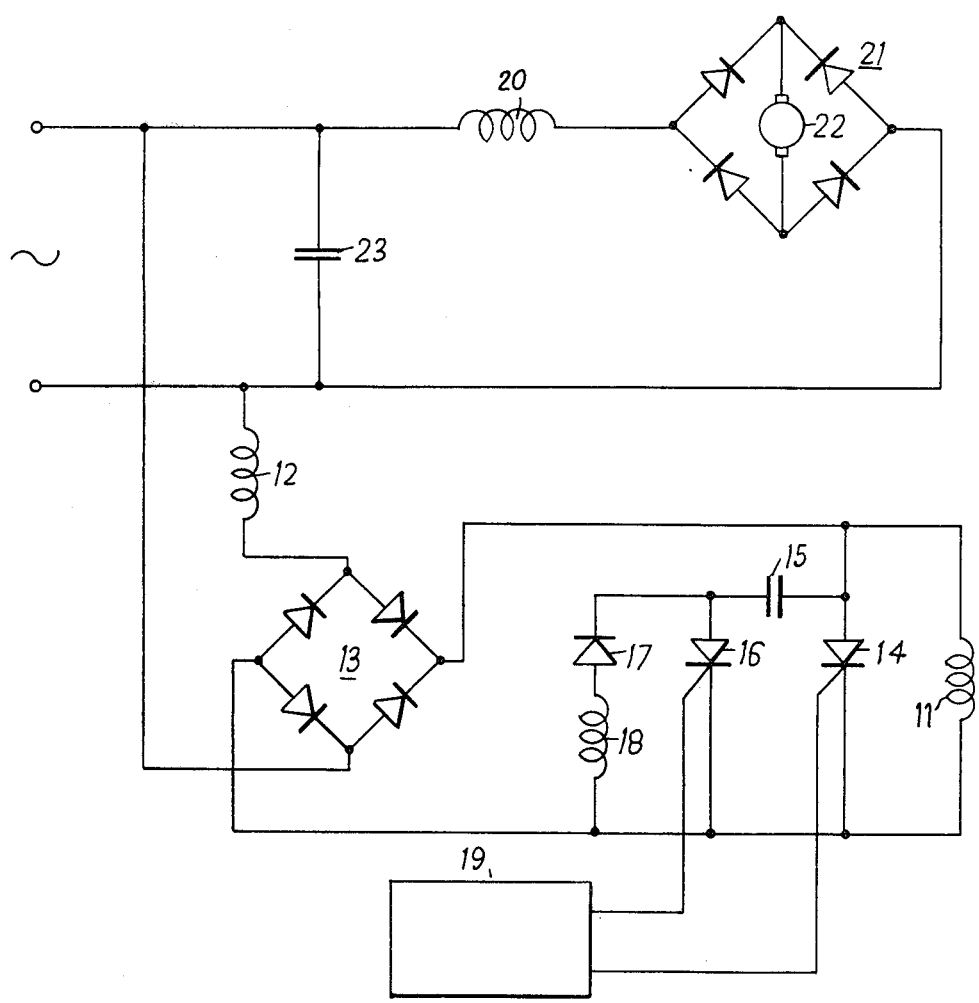
FIG. 1 is a circuit diagram of a separately excited motor according to one embodiment of the invention.

Referring to FIG. 1 of the drawings, a separately excited D.C. motor has a field winding 11 connected to the output terminals of a bridge rectifier 13. An inductor 12 in series with the input to the rectifier 13 serves to limit the current which may be drawn from the bridge rectifier. The rectifier 13 is connected to an A.C. source. A main thyristor 14 of a thyristor chopper shunts the field winding, the thyristor being connected by its cathode to the negative side of the rectifier 13 and thus serving, when rendered conducting, to divert current away from the field winding. The main thyristor is shunted by a commutation circuit of known kind comprising a commutating capacitor 15 in series with a commutating thyristor 16 connected in parallel with the main thyristor 14, the capacitor joining the anodes of the thyristors, and connected across the commutating thyristor 16 a diode 17 poled in the opposite sense to the thyristor in series with an inductor 18. The operation of this commutating circuit is well known and will not be described further.

The gate electrodes of thyristors 14 and 16 are connected to a pulse generator 19 which supplies a train of rectangular pulses of short duration to one thyristor gate electrode and another train of similar pulses to the other gate electrode, the leading edge of each pulse in one pulse train being delayed with respect to the leading edge of a corresponding pulse in the other pulse train. The pulses are of fixed period but the delay between pulses is infinitely variable such that a pulse can have a maximum delay of one period with respect to a corresponding pulse and a minimum delay of zero. The delay may be varied by means of an external control signal, that is to say a signal calling for a particular delay depending on the motor drive which is required. This signal may be supplied to the pulse generator in several ways. If, for example, it is desired to maintain a constant motor speed, a tachometer giving the monitored motor speed may be used to generate a feedback signal which is compared with a signal giving the desired motor speed, commonly referred to as the set-point signal. The difference of feedback signal and set point signal gives an error signal which may be used to control the delay. Alternatively, the control signal may be dependent on the setting of an accelerator pedal or the like.

The motor armature circuit includes regulator means for maintaining the armature current at a substantially constant level, comprising an inductor 20 in series with the input terminals of a full-wave bridge rectifier 21, the circuit being connected across the A.C. source. The armature 22 is connected to the output terminals of the rectifier bridge, and is designed for normal operation at a D.C. voltage substantially less than the root-mean-square A.C. source voltage. A power factor correction capacitor 23 is also connected across the A.C. source.

The operation of the circuit can now be appreciated. The current through field winding 11 is controlled by repetitively switching thyristor 14 so that current flows alternately through the thyristor and the field winding. This is achieved by means of the pulse generator 19 together with the commutation circuit formed by components 15 to 18. Thus, when thyristor 14 is rendered conducting by a pulse from pulse generator 19, which happens after the thyristor 16 has been rendered conducting by a pulse at its gate and has thus caused capacitor 15 to charge fully with its plate connected to the anode of thyristor 14 positive, supply current flows through a path formed by inductor 12, rectifier 13 and thyristor 14 back to the supply, by-passing the field winding. At the time thyristor 14 begins to conduct a sharp drop in potential occurs on the plate of capacitor 15 connected to the thyristor, causing a reversal of charge on the capacitor 15 by reason of capacitor discharge current flow through thyristor 14, inductor 18 and diode 17, the latter trapping the charge on the reversely charged capacitor 15. When after a predetermined delay thyristor 16 is rendered conducting by the pulse generator, the charge on the plate of capacitor 15 connected to the anode of thyristor 16 is released through the thyristor, causing a sharp drop in potential on the capacitor plate and a similar drop in potential on the capacitor plate connected to the anode of thyristor 14. This drop in potential is sufficient to momentarily reduce the current flow through thyristor 14 to a level at which the thyristor is commutated, and current thus flows through the field winding. When capacitor 15 has fully discharged through thyristor 16, this thyristor becomes non-conducting. After a further predetermined delay thyristor 14 is again rendered conducting, the process being repetitive.

The mean field, and when armature current flows, the mean torque, thus depends on the relative lengths of the periods of current flow through thyristor 14 and the field winding.

The armature 22 is energised with D.C. derived from the A.C. source through the inductor 20 and the full-wave rectifier 21. Because the A.C. source voltage is substantially higher than the armature operating voltage the armature reaction e.m.f. is small compared to the supply voltage and has little influence on the armature current, which is dependent by the A.C. source voltage, the armature impedance and the reactance of the inductor 20. The current remains substantially constant over the full range of armature speed, despite charges in reaction e.m.f. with speed, the current being determined by the reactance of inductor 20, which is substantially greater in magnitude than the armature impedance. The power factor correction capacitor, capactor 23, compensates for the low, lagging power factor produced by the motor in operation.

It will be noted that inductor 12 serves solely to limit the current passed when thyristor 14 is conducting, and may therefore optionally be replaced by a resistor or some form of electronic chopper circuit. The latter alternative is particularly suitable if it is desired to energise the field winding directly from a D.C. source, the bridge rectifier 13 being removed in this case. Alternatively, a constant current D.C. source may be used. Also, a pulse generator which supplies a train of pulses of variable mark-space ratio to one thyristor gate electrode and the complement of the train of pulses to the other gate electrode may be used in place of pulse generator 19. Pulse width or pulse frequency modulation of the thyristor may be used. Further, thyristor 14 may be replaced by other forms of semi-conductor switch, for example by a silicon controlled switch, making the provision of a commutating circuit unnecessary.

Figure 2:
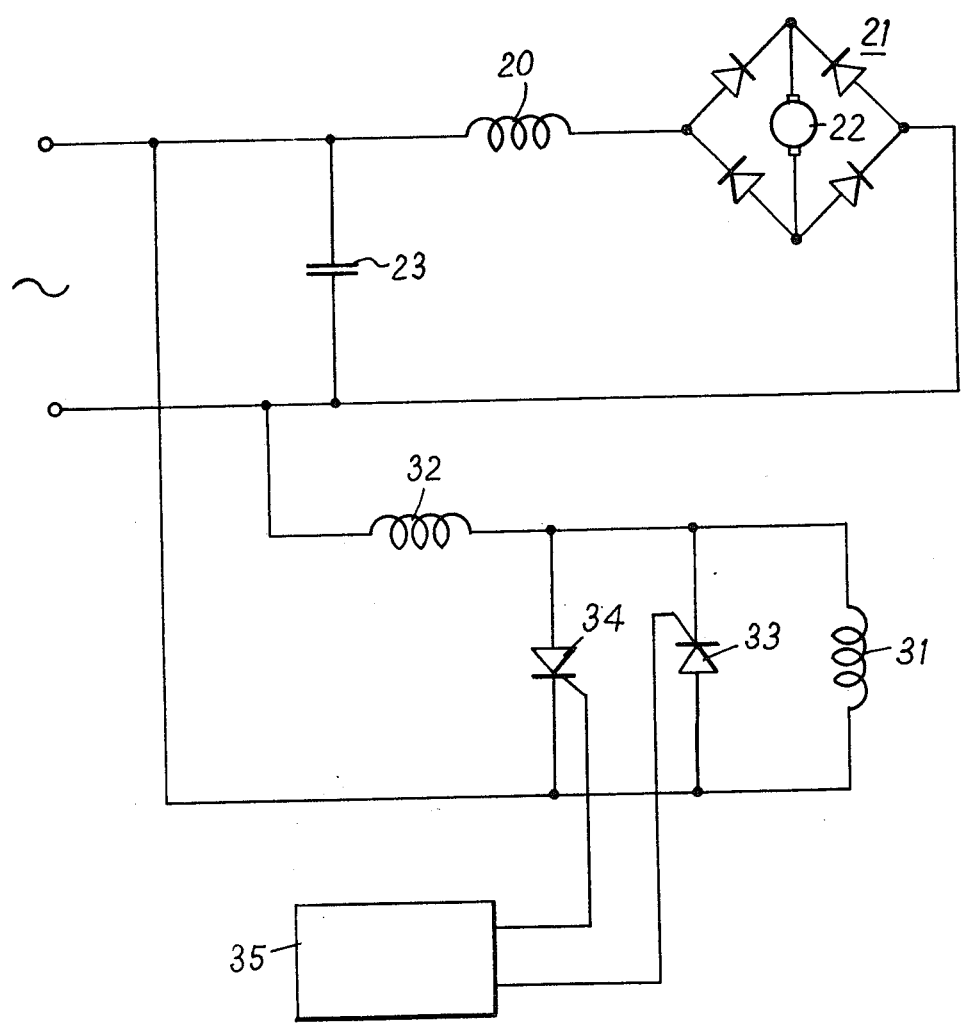
FIG. 2 is a circuit diagram of a second embodiment of the invention.

Referring now to FIG. 2 of the drawings, a field winding 31 is connected across an A.C. supply via an inductor 32, the r.m.s. A.C. supply voltage being of substantially greater magnitude than the voltage at which the field winding is normally operated. The inductor 32 serves to limit the current drawn by the circuit and may therefore suitably comprise any other form of impedance, for example a resistor or a capacitor. Two thyristors, 33 and 34, are both connected in parallel with the field winding, thyristor 33 being poled with its cathode and thyristor 34 with its anode adjacent the end of field winding 31 which is connected to inductor 32.

The gate electrodes of thyristors 33 and 34 are connected to a pulse generator 35, which provides a train of rectangular pulses of short duration to each of the thyristor gate electrodes, each of the pulse trains being at the frequency of the field supply and having a variable delay with respect to the start of each supply voltage cycle. The pulse train supplied to the gate thyristor 33 has, in addition to the variable delay, a fixed delay of a half cycle with respect to the start of the supply cycle.

The armature circuit is identical to that of FIG. 1 and will not be described further.

The operation of the circuit can now be appreciated. Assume initially that neither of the pulse trains has a delay. Thyristor 34 will thus be rendered conducting by a pulse at the start of each positive-going half cycle and will remain in conduction until the end of the half cycle, thyristor 33 similarly being rendered conducting at the start of each negative-going half cycle and remaining in conduction until the end of the half cycle. When one thyristor is conducting the other thyristor is always non-conducting. The thyristors thus shunt out the field winding at all times and no field current is passed. If, however, the pulse train supplied to the gate electrode of thyristor 34 is delayed, current will flow through the field winding during the periods of the delay, the field current being quickly established because of the high supply voltage and being limited only by the inductor 32. In this situation thyristor 33 acts as a so-called "free-wheel" diode during the negative-going half cycles and serves to maintain field current flow over these half cycles. Similarly, if the pulse train supplied to the gate electrode of thyristor 33 is given a delay in addition to its basic half cycle delay, field current flows in the opposite sense to the previous case, thyristor 34 acting as a free-wheel diode during the positive half cycles. The magnitude of the field current can thus be varied in dependence upon the magnitude of the delay, the direction being determined by which pulse train is delayed. As the field current, and thus the field, may be in either direction, the motor is reversible.

Figure 3:
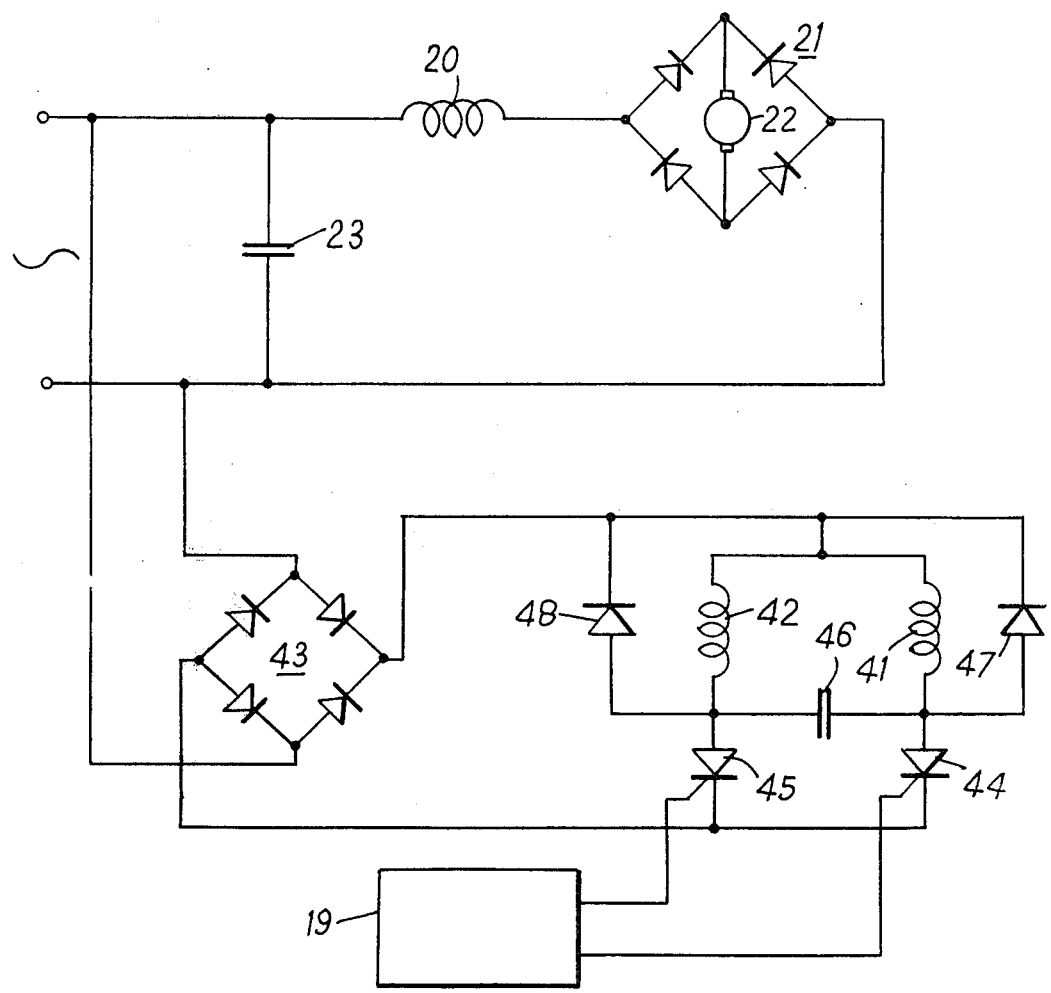
FIG. 3 is a circuit diagram of a third embodiment of the invention.

In FIG. 3 of the drawings the field circuit has a field winding consisting of two identical field coils 41 and 42, which are connected to the output of a bridge rectifier 43 so as to produce opposing magnetic fields. The rectifier input is connected to an A.C. source. Thyristors 44 and 45 are connected in series with field coils 41 and 42 respectively, both thyristors being connected at their cathodes to the negative output of rectifier 43 and at the junction with the field coil at each of their anodes to respective plates of a commutating capacitor 46. Field coils 41 and 42 are shunted by free-wheel diodes 47 and 48 respectively which are connected at their cathode ends to the positive side of the supply, and which serve to maintain current flow during the non-conducting periods of the thyristors.

The gate electrodes of the thyristors are each connected to a pulse generator 19, a train of rectangular pulses of short duration being supplied to one thyristor gate electrode and another train of identical pulses delayed with respect to the first train to the other gate electrode.

The armature circuit is identical to that of FIG. 1 and will not be described further.

The operation of the circuit can now be appreciated. The net motor field depends on the relative strengths of the two opposing fields produced by field coils 41 and 42, and is controlled by varying the field current in each of the coils by switching thyristors 44 and 45. By means of the commutating capacitor 46 and the pulse generator 19, the thyristors are caused to conduct alternately. For example, if thyristor 44 is conducting and thyristor 45 is non-conducting, charging current flows through thyristor 44, capacitor 46, and field winding 42. Current also flows through field winding 41 and thyristor 44, producing the field. When, after a predetermined delay, thyristor 45 is in turn rendered conducting by the pulse generator, the plate of capacitor 46 connecting with the anode of thyristor 45 is suddenly lowered in potential, and a similar drop in potential is produced on the capacitor plate connected to the anode of thyristor 44. This drop in potential is sufficient to commutate thyristor 44. Thyristors 44 and 45 are now non-conducting and conducting respectively, and charging current flows through field winding 41, thyristor 45, and in the reverse direction through capacitor 46. Current flows through field winding 42 and thyristor 45, producing a field which acts in opposition to the field produced in field winding 41. After a further predetermined period thyristor 44 is again rendered conducting and thyristor 45 is commutated, the process then being repetitive.

The net field, and when armature current flows, the net torque, thus depend on the relative lengths of the periods of conduction of the two thyristors. As the net field may be in either direction, the motor is reversible. Alternatively, if the motor is operated unidirectionally, the direction of the torque determines whether the motor is accelerating or braking.

It will be appreciated that the circuit may be modified by connecting the thyristors in parallel with the field windings and removing capacitor 46 and diodes 47 and 48. In such an embodiment current limiting means are required in the path between the thyristors and rectifier 43, and a commutation circuit is required for the thyristors. Alternatively, the thyristors may be replaced by silicon controlled switches, making the provision of a commutating circuit unnecessary.

Figure 4:
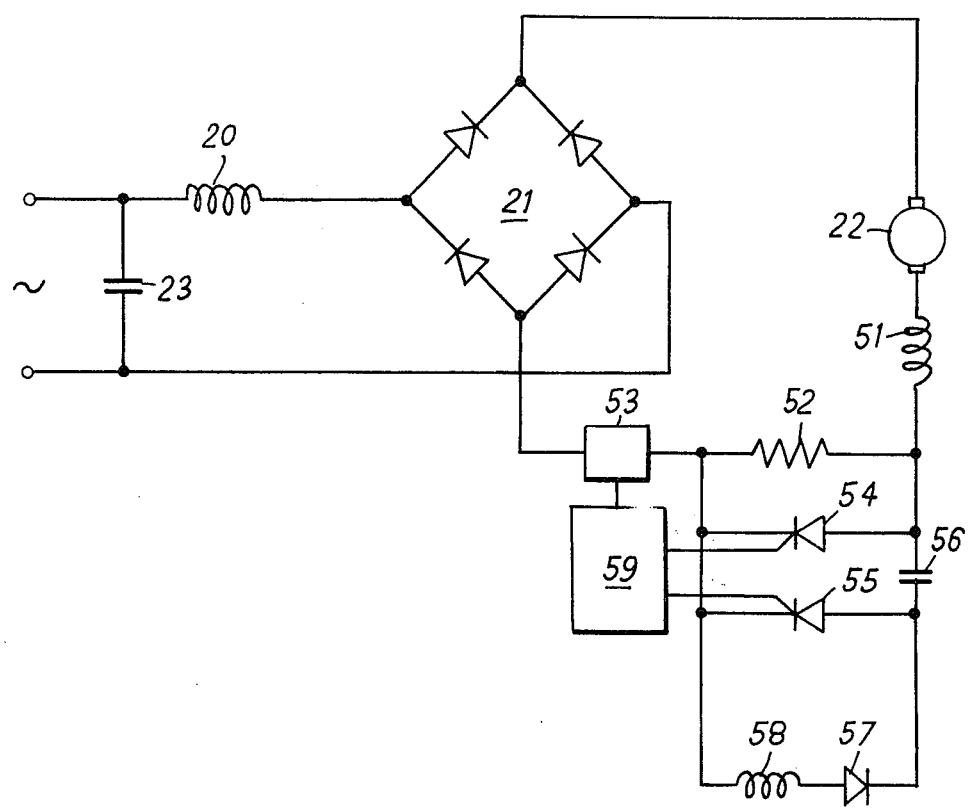
FIG. 4 is a circuit diagram of an alternative armature circuit, for use in the embodiments of the invention.

FIG. 4 shows an armature circuit for use with the field circuits shown in FIGS. 1 to 3 for plugging operation, i.e., reversal of the armature or field connections to brake the motor. It has been found that on plugging the voltage generated across the motor armature is in the reverse sense to normal motoring operation and causes forward conduction of the bridge diodes. The generated armature voltage is, in effect, short-circuited and can give rise to excessive armature current.

For effecting control of the armature current during plugging of the motor, the series circuit of the armature 22 and rectifier bridge 21 includes in series an inductor 51, a resistor 52 and a current sensing device 53. The resistor 52 and inductor 51 serve to limit the armature current during plugging. Controllable static switching means in the form of a thyristor chopper are provided, the main thyristor 54 of which is connected in parallel with the resistor 52 and is poled so that in its conducting state it passes armature current and thereby short circuits the resistor. The chopper also includes a commutation circuit for thyristor 54 of the kind described in connection with the field circuit of FIG. 1, comprising a commutating thyristor 55 in series with a commutating capacitor 56 connected in parallel with the main thyristor, the capacitor joining the anodes of the thyristors, and connected across the commutating thyristor a diode 57 poled in the opposite sense to the thyristor in series with an inductor 58.

Connected to the gate electrodes of the thyristors are respective outputs of a pulse generator 59 which serves to control the thyristor chopper in dependence on the current in the armature circuit sensed by the current sensing device 53, the pulse generator and current sensing device together forming a controller for the chopper.

The operation of the circuit can now be appreciated. In normal motoring operation the armature current is such that thyristor 54 is held in conduction and thereby short-circuits resistor 52, the armature 22 being energised by D.C. derived from the A.C. source by way of the regulator inductor 20 and the rectifier bridge 21. Inductor 20 serves to maintain a substantially constant armature current as described above in connection with FIG. 1.

When the motor is plugged, for example to slow down an overhauling load, the generated armature voltage is reversed in polarity and is short-circuited by the diodes of rectifier bridge 21. The armature current then rises, the rise being slowed down by inductor 51 in the armature circuit, and at a predetermined current limit the controller causes thyristor 54 to be commutated, armature current then circulating in the series path formed by the armature 22, inductor 51, resistor 52 and bridge 21. The resistor 52 thus serves to dissipate energy and brake the motor. The armature current thereafter drops until a predetermined lower current is reached at which thyristor 54 is again rendered conducting and resistor 52 short-circuited. Accordingly, the thyristor 54 conducts in pulses and resistor 52 is introduced into the armature circuit during interpulse periods. There is effectively created an on-off ratio for the period in which resistor 52 is in the armature circuit, the armature current being maintained at a predetermined average level.

I claim:

1. A separately excited speed controlled D.C. motor having an armature, regulator means connected to the armature and including voltage-dropping means to permit connection of the armature with a source of supply voltage substantially greater in magnitude than the rated supply voltage of the armature and to maintain the armature current at a substantially constant level during such connection, a field winding, and controllable static switching means connected to the field winding and operable to vary the current through the field winding when the field winding is connected with the supply voltage source or other source of excitation, thereby to control the armature torque and therefore the speed in dependence on the magnitude of the current in the field winding.

2. A motor as claimed in claim 1, wherein the controllable static switching means are operable, when the field winding is connected with its source of excitation, to maintain a current flow from the source at all times.

3. A motor as claimed in claim 2, wherein current limiting means are provided in the path between the field winding and its source of excitation, the controllable static switching means during conduction thereof being operable to divert current from the field winding.

4. A motor as claimed in claim 3, wherein the controllable static switching means include a semiconductor switch in shunt with the field winding and means for repetitively opening and closing the semiconductor switch, so as to afford a variable mean current in the field winding.

5. A motor as claimed in claim 4, wherein the semiconductor switch is a thyristor.

6. A motor as claimed in claim 3, wherein the source of excitation for the field winding is an A.C. source, and the controllable static switching means include a pair of semiconductor switches connected in parallel and adapted to conduct current in opposite senses, the switches being alternately rendered conducting during respective half cycles of opposite polarities of the supply voltage.

7. A motor as claimed in claim 6, wherein the semiconductor switches are thyristors.

8. A motor as claimed in claim 1, wherein the field winding comprises first and second field coils arranged to produce opposing magnetic fields, the controllable static switching means serving to afford a variable mean current in each of the field windings.

9. A motor as claimed in claim 8, wherein the controllable static switching means include first and second semiconductor switches in series respectively with the first and second field coils and are operable to repetitively open and close each of the switches.

10. A motor as claimed in claim 9, wherein the controllable static switching means serve to ensure that at all times one or other of the field coils is energised.

11. A motor as claimed in claim 10, wherein the first and second semiconductor switches comprise respective first and second thyristors.

12. A motor as claimed in claim 11, wherein a commutating capacitor is provided connecting the thyristors and serves, in operation, when one thyristor is rendered conducting, to commutate the other thyristor.

13. A motor as claimed in claim 8, wherein current limiting means are provided in the path between the field coils and their source of excitation, the controllable static switching means including first and second semiconductor switches in shunt respectively with the first and second field coils and being operable repetitively to open and close each of the switches.

14. A motor as claimed in claim 13, wherein the controllable static switching means serve to ensure that at all times one or other of the field coils is energised.

15. A motor as claimed in claim 14, wherein the first and second semiconductor switches comprise respective first and second thyristors.

16. A motor as claimed in claim 6, wherein the controllable static switching means are operable to permit connection of the field winding with a source of excitation which provides a voltage of greater magnitude than its rated voltage.

17. A motor as claimed in claim 1, wherein the regulator means include a series circuit including impedance means and a full wave rectifier bridge having output terminals connected to the armature and input terminals connected to the impedance means.

18. A motor as claimed in claim 17, wherein the regulator means include further controllable static switching means in the series circuit including the armature and the rectifier bridge and control means for maintaining the said controllable static switching means in conduction during motoring operation and for effecting pulsed conduction of the controllable static switching means during plugging, a resistor being introduced into the said series circuit during interpulse periods and the pulsed conduction being controlled by the control means to maintain during plugging a predetermined average armature current.

19. A motor as claimed in claim 18, wherein the resistor is connected in the series circuit including the armature and the rectifier bridge and is short-circuited by the further controllable static switching means during conduction thereof.

20. A motor as claimed in claim 1, wherein the regulator means includes means in series with the armature exhibiting during operation reactance which is substantially greater in magnitude than the armature impedance.

* * * * *